United States Patent [19]

Tübke

[11] Patent Number: 5,193,973
[45] Date of Patent: Mar. 16, 1993

[54] PALLETIZING SYSTEM

[75] Inventor: Axel B. Tübke, Berlin, Fed. Rep. of Germany

[73] Assignee: System GmbH, Düsseldorf, Fed. Rep. of Germany

[21] Appl. No.: 770,779

[22] Filed: Oct. 4, 1991

Related U.S. Application Data

[63] Continuation of Ser. No. 456,683, Dec. 28, 1989, abandoned.

[30] Foreign Application Priority Data

Dec. 31, 1988 [DE] Fed. Rep. of Germany ....... 3844504

[51] Int. Cl.⁵ ............................................. B65G 59/02
[52] U.S. Cl. ............................... 414/796.9; 108/52.1; 108/53.3; 414/792.9
[58] Field of Search ................ 108/52.1, 53.3; 235/456, 462, 470; 414/791.6, 789.5, 792.9, 796.9, 902, 907, 926

[56] References Cited

U.S. PATENT DOCUMENTS

| | | | |
|---|---|---|---|
| 3,112,715 | 12/1963 | Callahan et al. | 108/52.1 X |
| 3,888,364 | 6/1975 | Inoue et al. | 414/796.8 X |
| 4,383,788 | 5/1983 | Sylvander . | |
| 4,787,810 | 11/1988 | Cawley et al. | 414/789.5 X |
| 4,988,264 | 1/1991 | Winski | 414/796.8 X |

FOREIGN PATENT DOCUMENTS

| | | | |
|---|---|---|---|
| 598516 | 5/1960 | Canada | 108/52 |
| 0296346 | 12/1988 | European Pat. Off. . | |
| 2156867 | 5/1973 | Fed. Rep. of Germany . | |
| 2446464 | 2/1976 | Fed. Rep. of Germany . | |
| 3613462 | 10/1987 | Fed. Rep. of Germany . | |
| 3718601 | 12/1988 | Fed. Rep. of Germany . | |
| 2305363 | 10/1976 | France . | |
| 2453084 | 10/1980 | France . | |
| 216830 | 12/1983 | Japan | 414/902 |
| 619672 | 10/1980 | Switzerland . | |
| 2205300 | 12/1988 | United Kingdom . | |

OTHER PUBLICATIONS

Search Report of the Federal Republic of Germany for application number P 39 07 333.5, dated Oct. 5, 1989.

Primary Examiner—David A. Bucci
Assistant Examiner—Janice Krizek
Attorney, Agent, or Firm—Spencer, Frank & Schneider

[57] ABSTRACT

A palletizing system for moving stackable objects, particularly printed products arranged in stacks, includes a gripping device with gripping tines. The gripping device is arranged at an arm which is driven so as to be rotatable about a vertical axis. An intermediate member serves as the support for a plurality of stacks to be deposited in one plane. The intermediate member has raised portions between which passages are provided that are accessible from at least one edge and that have a width corresponding at least to the width of the tines and a height corresponding at least to the height of the tines. The distance between the passages is related to the distance between the tines and the passages are open toward the top.

8 Claims, 7 Drawing Sheets

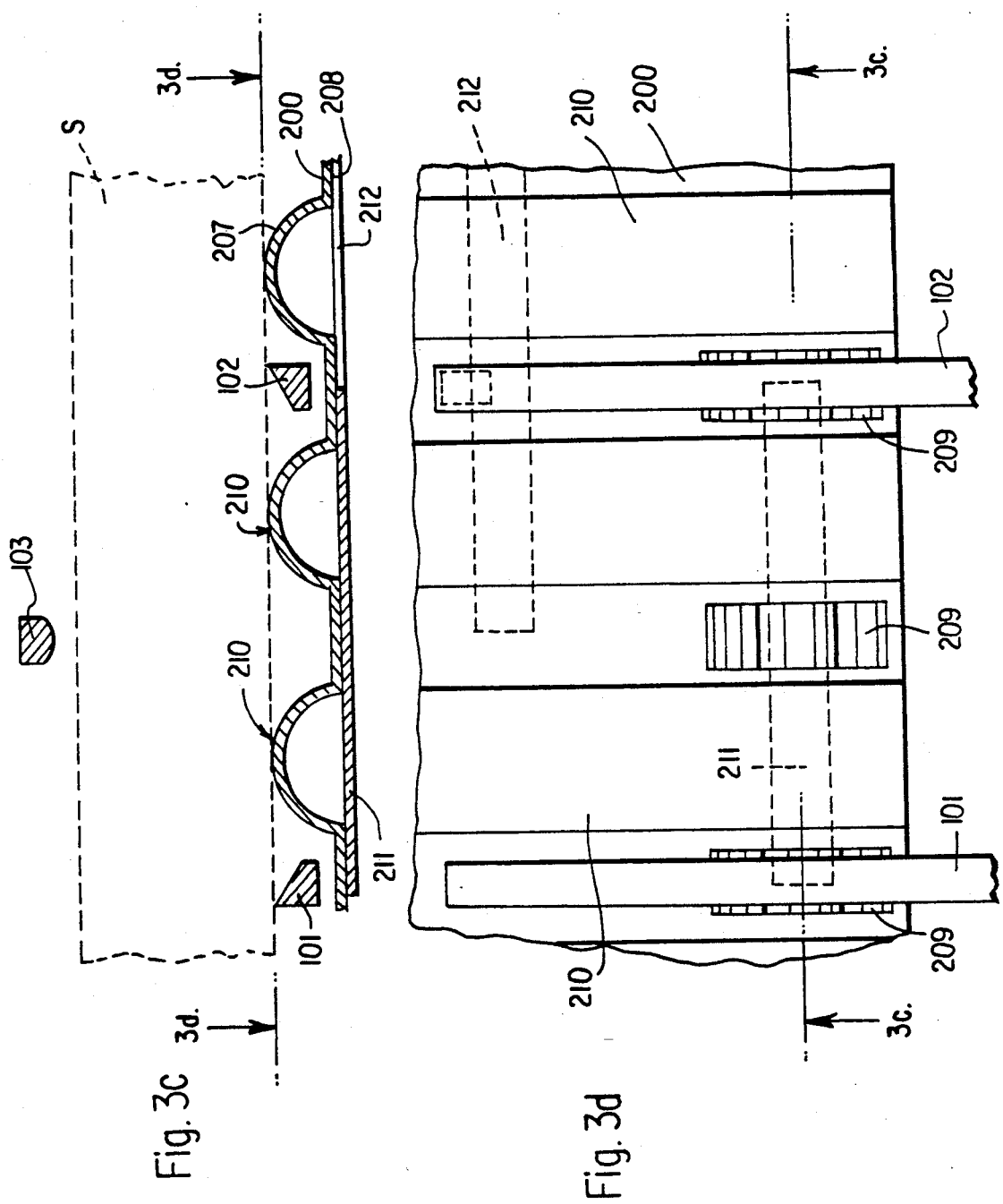

PALLETIZING SYSTEM

This application is a continuation of application Ser. No. 07/456,683, filed Dec. 28, 1989, abandoned.

CROSS REFERENCE TO RELATED APPLICATIONS

This application has subject matter related to application Ser. No. 07/456,690, now U.S. Pat. No. 5,087,169 and application Ser. No. 07/456,684, now U.S. Pat. No. 5,042,862 both filed on Dec. 28, 1989.

The invention relates to a palletizing system including a palletizing robot of the type for moving stackable objects, particularly printed products arranged in stacks. The system includes a gripping device arranged at an arm that is driven so as to be rotatable about a vertical axis and is equipped with gripping tines.

Such a palletizing robot for moving stackable objects is disclosed in DE 3,102,431.A1 (Federal Republic of Germany printed unexamined application), which is a counterpart to U.S. Pat. No. 4,383,788 to Sylvander. The prior art robot has a similar structure to an industrial robot with an accessory device for gripping packets. It is configured as a stand-alone unit having an arm which is pivotal about a central base and to whose end the gripping device is fastened.

The drawback is that the prior art palletizing robot permits palletizing only since the gripper is unable to simply pick up of stacks from a pallet. Depalletizing, however, is not possible with this device without further devices or additional means.

DE 3,613,462.A1 discloses a device for loading and unloading a stacking lift including a board transporting device. The board here serves as a support for stacks of thin sheets and is provided with recesses oriented inwardly from the side for a gripping device, with the board being carried on the side by the housing of the device.

However, this type of support is not suitable as an intermediate member because, on the one hand, the board in its solid configuration has much too great a weight so that the palletized stacks are stressed unilaterally at their raised portions and are thus damaged. On the other hand, a board is inflexible and does not adapt itself to the tolerances resulting from height differences of the stacks. Stable stacking is thus impossible, particularly with stacks of thin sheet material.

SUMMARY OF THE INVENTION

It is an object of the invention to permit palletizing as well as depalletizing in a system of the above-mentioned type.

This object is accomplished by the invention, according to which briefly stated, a palletizing system for moving stackable objects comprises an arm, and a gripping device pivotally attached to the arm for rotation about a substantially vertical axis. There is a plurality of gripping tines attached to the gripping device. Each one of the gripping tines has a height and width, and each tine is at a predetermined spacing from adjacent ones of the gripping tines. Also, an intermediate member is provided for supporting a plurality of stackable objects to be deposited in substantially one plane. The intermediate member includes a plurality of raised portions between adjacent ones of which upwardly open passages are provided. Each passage is accessible from an edge of the intermediate member, and each passage has a width at least as wide as the width of the gripping tines. Each passage is at least as high as the height of the tines, and the passages establish a spacing between adjacent passages corresponding to the predetermined spacing between the gripping tines.

The invention is based on the realization that intermediate members as features of the system according to the invention make available an access region for a fully automatic gripping device from which the gripper can always remove the stacks to be depalletized while leaving behind the intermediate member. The intermediate members are reusable and, after removal of a stack layer, are removed as a whole by means of a suction device or some other transporting device, advantageously also by the gripping system itself. During palletizing, once a stack layer has been produced and before the new layer is started, such an intermediate member is inserted automatically according to a program.

If the raised portions are configured, according to a preferred modification, in the form of corrugations and/or nubs, access of the gripper is possible from two or more sides, with the gripper advantageously configured to be pivotal as a whole about a vertical axis. In this connection, it is particularly favorable that the nub-shaped raised portions are disposed in the plane of the intermediate member at coinciding sequences of spacing with respect to two mutually perpendicular axial directions.

Preferably corrugated raised portions in the intermediate members are substantially prevented from being flattened under load if the corrugations are provided on their undersides with connecting elements in the form of pull strips which each connect two adjacent corrugation troughs with one another.

Particularly, reusable intermediate members can be advantageously transported and stored in a space saving manner, if the arrangement of the maximum raised portions on the upper faces of the intermediate members corresponds to the arrangement of recesses on their undersides so that the intermediate members are stackable. They are produced of a thin sheet material having an essentially constant thickness which advantageously is also flexible in such a way that the intermediate members can be rolled up and/or cut.

Gripping of the intermediate member, which extends in each case over the entire surface area of the pallet, is facilitated if the surfaces of the intermediate members are made so smooth that they can be transported by means of suction devices.

In a preferred modification, the intermediate member may itself serve to control the palletizing and depalletizing process, if it is provided with coding that can be read by means of a reading device provided on the gripper. In this way, the intermediate member receives instructions for a certain palletizing scheme which is available for controlling the gripper or grippers for palletizing as well as depalletizing without individual control measures or a program being required. The information about type and placement of the stacks thus remains available along predetermined paths of the flow of goods. Such coding is preferably disposed in the region of the edges of the intermediate members.

The control codes are transferred, in particular, into a memory of the control device for the gripper, with the memory being provided in such a way that it includes control codes for a scheme for arranging the stackable objects on the pallets, with addressing means being provided for the memory and the output signals of the code reading means are fed as input signals to the addressing means which select the control codes belonging to a scheme and feed the control codes to the inputs of the control unit for a gripper in order to move the stackable objects.

BRIEF DESCRIPTION OF THE DRAWINGS

FIG. 1b is a top plan view of the embodiment of FIG. 1a.

FIG. 3a is a detailed sectional view of intermediate member for supporting the material to be palletized, taken along line 3a-3a of FIG. 3b.

FIG. 3b is a top plan view of the intermediate member of FIG. 3a, as seen in direction 3b-3b of FIG. 3a.

FIG. 3c is a detailed sectional view similar to FIG. 3a of a variation of an intermediate member for supporting the material to be palletized, taken along line 3c-3c of FIG. 3d.

FIG. 3d is a top plan view of the intermediate members of FIG. 3c, as seen in direction 3d-3d of FIG. 3c.

FIG. 5 is a block circuit diagram of a control circuit for the embodiment of FIG. 1a.

DESCRIPTION OF THE PREFERRED EMBODIMENT

Figure 1A:
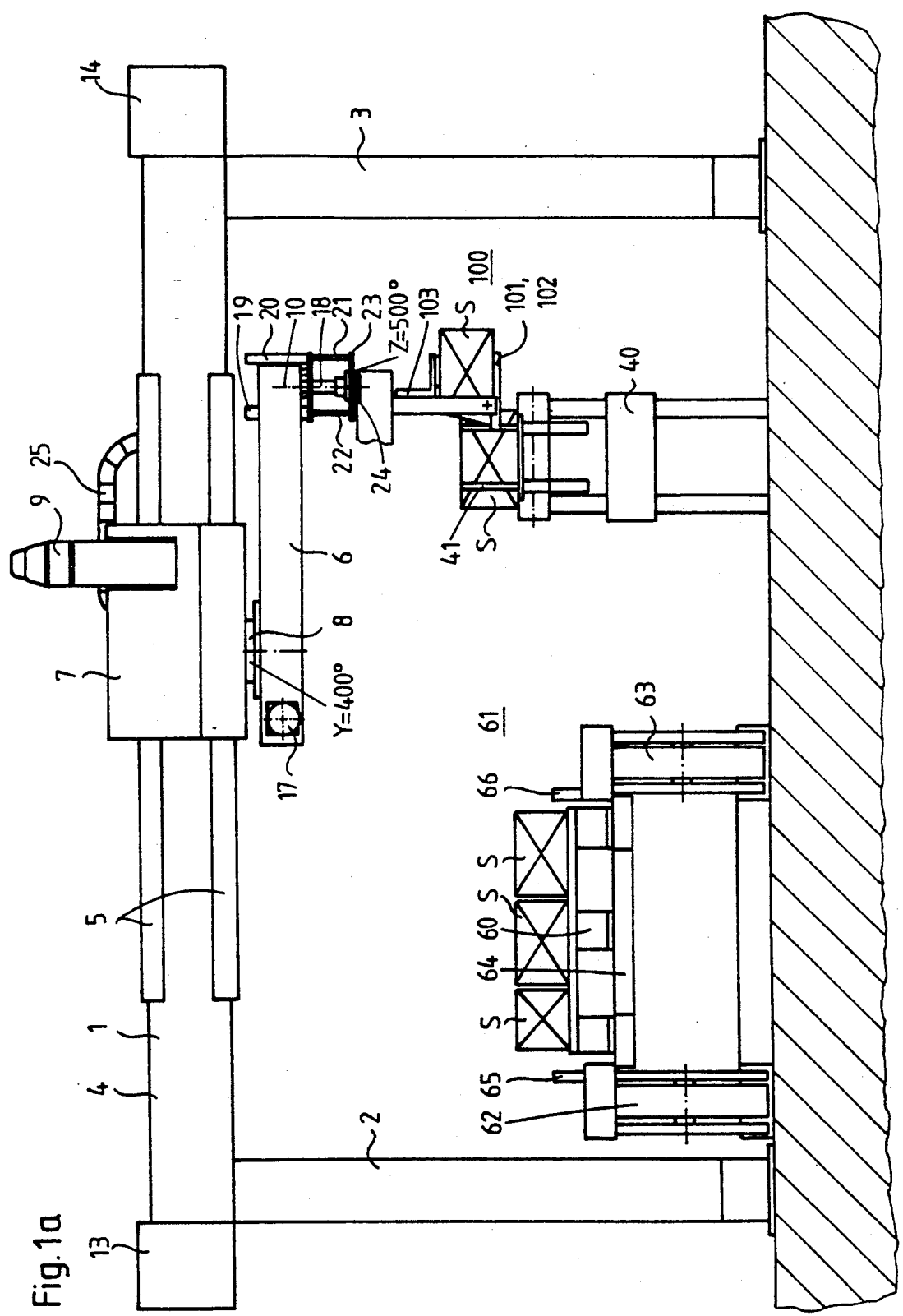
FIG. 1a is a side elevational view of a preferred embodiment of the invention.
Figure 1B:
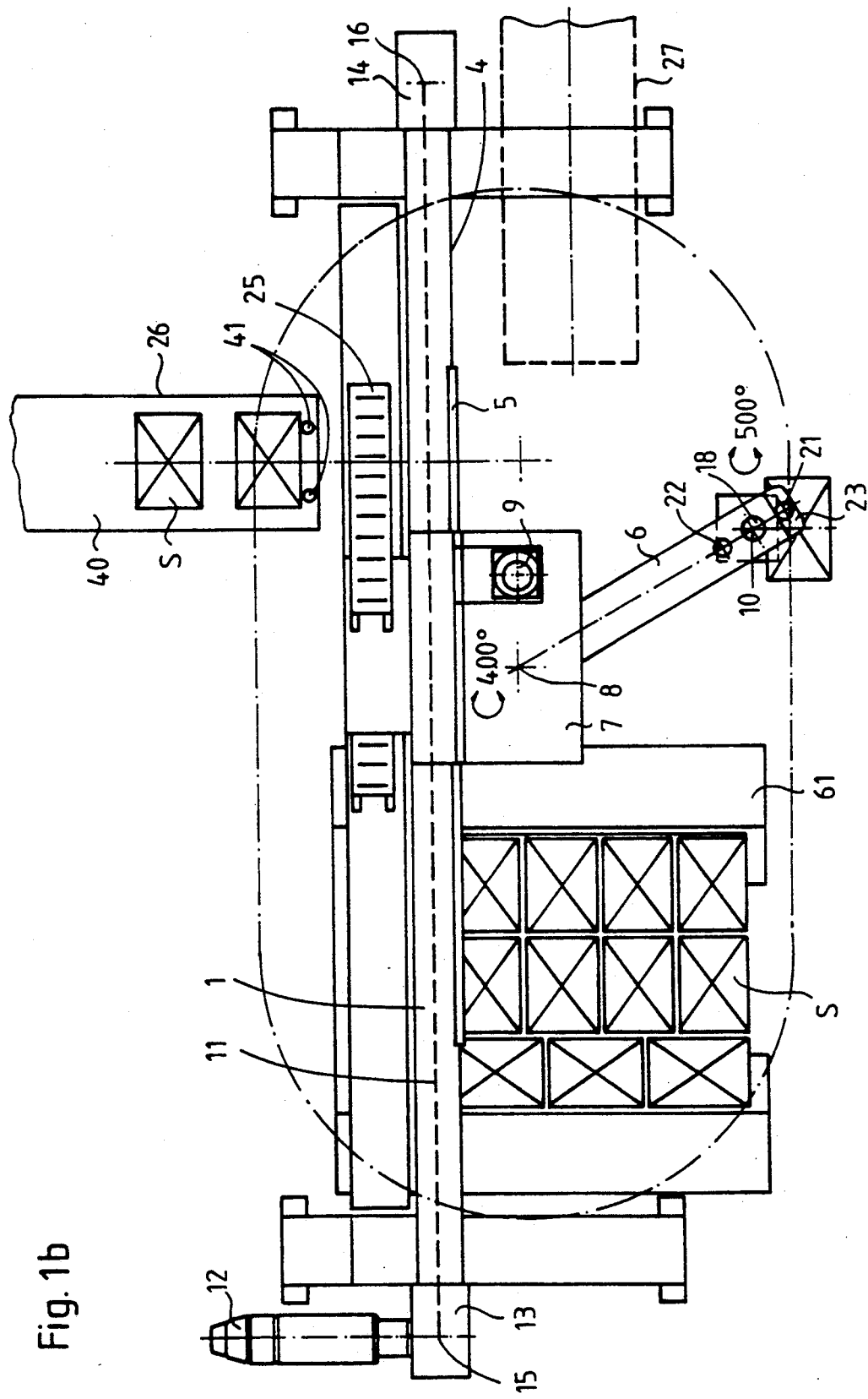

In the side view and top view, respectively, of the preferred embodiment of the invention shown in FIGS. 1a 1b, a transverse member 1 extends over the operating range of the device. At its ends, the transverse member 1 is connected with two supports 2 and 3 in the form of stands, with supports 2 and 3 having at least the height of the required processing space.

At one side 4 of transverse member 1, a track 5 is provided which has the length of the lateral displacement path of an arm 6. Arm 6, which is suspended from a rotating device 8 so as to be able to rotate over a rotation angle of 400; is mounted so as to be displaceable by means of a guiding device 7 in the direction of transverse member 1. Rotating device 8 is driven electrically by means of a motor 9 which is screwed to a housing of guiding device 7.

Guiding device 7 receives its actuation for a displacement movement in the direction of transverse member 1 by way of a toothed belt 11, which is not visible in the drawing but is indicated by dashed lines in FIG. 1b, from a motor 12. Toothed belt 11, which extends within transverse member 1, is stretched from the one drive housing 13 accommodating motor 12 to a drive housing 14 which is connected with transverse member 1 at its opposite end. Toothed belt 11 is brought over a toothed wheel 15 at motor 12 to guiding device 7. Toothed belt 11 is connected with guiding device 7 in such a way that movement of toothed belt 11 causes guiding device 7 to move simultaneously. Following guiding device 7, toothed belt 11 extends over a reversal roller 16, which is not visible here and which is mounted in drive housing 14, back to motor 12.

The free end of arm 6 is provided with a rotating device 10 to which is attached a gripping device 100. Rotating device 10 is driven by a motor 17 which is attached to the side of the arm opposite rotating device 10, with the transmission of force from motor 17 to rotating device 10 taking place by way of a further toothed belt. The force is then transmitted further from rotating device 10 by way of a shaft 18 to gripping device 100, with shaft 18 being vertically displaceable by a predetermined amount.

In the vicinity of shaft 18, two lifting rods 21 and 22 are disposed which are associated with two pneumatic cylinders 20 and 19. Pneumatic cylinders 19 and 20 are arranged in parallel and connected with the free end of arm 6. The lifting rods are movable in a direction for moving gripping device 100 relative to arm 6. At the ends of lifting rods 21 and 22 opposite pressure cylinders 19 and 20, there is provided a lifting plate 23 which, together with a connecting device 24 of gripping device 100, is connected with shaft 18. The maximum stroke is predetermined by the difference between the retracted position and the maximum extended position of lifting rods 19 and 20.

Guiding device 7, motor 9 and motor 17, as well as the moving device for gripper 100 are linked to the control device by way of a cable strand, with the cable strand being guided in a jointed strip 25 in transverse member 1.

Due to the few joints in the palletizing robot, the palletizing speed is high while a large access range is maintained. Arm 6 is rigid and is preferably aluminum with a box-shaped sectional profile.

The single rotating device 8 of rigid arm 6 rotates about a vertical axis, and together with the horizontal guiding device 7 for the rotatably mounted end of arm 6, permits quick and precise movement of arm 6 together with gripping device 100 over a large range of operation. To compensate for the different deposit and pickup surfaces created by warping or tolerances in the stack heights during palletizing and depalletizing, gripping device 100 is configured so as to be displaceable over a vertical lifting movement of a few centimeters by means of vertically oriented lifting rods 21 and 22. Lifting rods 21 and 22 form a simple auxiliary vertical guide for gripping device 100. Due to the small radius of movement, the vertical compensating movement of gripping device 100 does not adversely influence the high palletizing speed.

FIGS. 1a and 1b show a longitudinal conveyor 40 which supplies a stack S of printed products and which has, at its end, an abutment device 41. The conveyor is disposed in the pivot range of arm 6. Gripping device 100 picks up stack S from the end of longitudinal conveyor 40. The lower first tines 101 and 102 then enter into recesses provided in the longitudinal conveyor below stack S which is disposed at the abutment device. Together with second tine 103, which has the configuration of a pressing jaw, the lower two first tines 101 and 102 compress stack S. Then pressure cylinders 19 and 20 move lifting rods 21 and 22 upwardly until the height of abutment device 41 is overcome. In the illustrated embodiment, stack S may be composed of loose or bound stacks of magazines or products from a gather-stitcher collector/stapler.

The stack is now moved by coordinated movement of guiding device 7, rotating device 8, arm 6, rotating device 10, gripping device 100 and lifting rods 21 and 22 in the direction toward a pallet 60 on a lifting table 61 which can be moved vertically by the desired stack height. Lifting table 61 is accordingly located within the maximum displacement and/or rotation range of the palletizing robot.

Lifting table 61 includes a plate 64 vertically movable between stands 62 and 63 and supporting a pallet 60 on which, in turn, are stacks S. Connected with the stands is a light transmitter 65 and light receiver 66 of a light barrier whose light beam traverses the lifting table at the height of the access range of the lower first tines of the gripper. The light beam is reflected at several reversal points and is guided in such a manner that it covers the entire region of the pallet at a maximum beam distance which is smaller than the smallest transverse dimension of a stack to be monitored. If one layer has been removed, i.e. if during a depalletizing process all conveying processes have been performed for a palletizing pattern, the table is raised by one stack height as a result of the signal emitted by the light barrier given that the light path is now unobstructed. During the palletizing process, once one level has been loaded, plate 64 is lowered according to the palletizing pattern until the light path is unobstructed again.

As shown in FIG. 1b, two possible positions 26 and 27 are given for the longitudinal conveyor. The palletizing takes place according to a predetermined scheme which the robot follows successively and deposits the stacks at the predetermined locations. Lifting table 61 moves downwardly by the height of one stack S whenever a layer of stacks S has been deposited on pallet 60. The process is repeated until the pallet load has reached a desired height. Thereafter, the lifting table is lowered completely and deposits the pallet on a DTS (driverless transporting system), not shown here. The DTS transports the pallet out of the processing room and another DTS moves an empty pallet 60 onto lifting table 61 and this transporting process, as part of the so-called "palletizing process," begins anew.

The sequence may also be reversed in the course of depalletizing so that stacks S are moved from pallet 60 to a longitudinal conveyor 40. However, as prerequisite of the gripping of stacked material are intermediate members 200 which are described in connection with FIGS. 3a and b.

Figure 2:
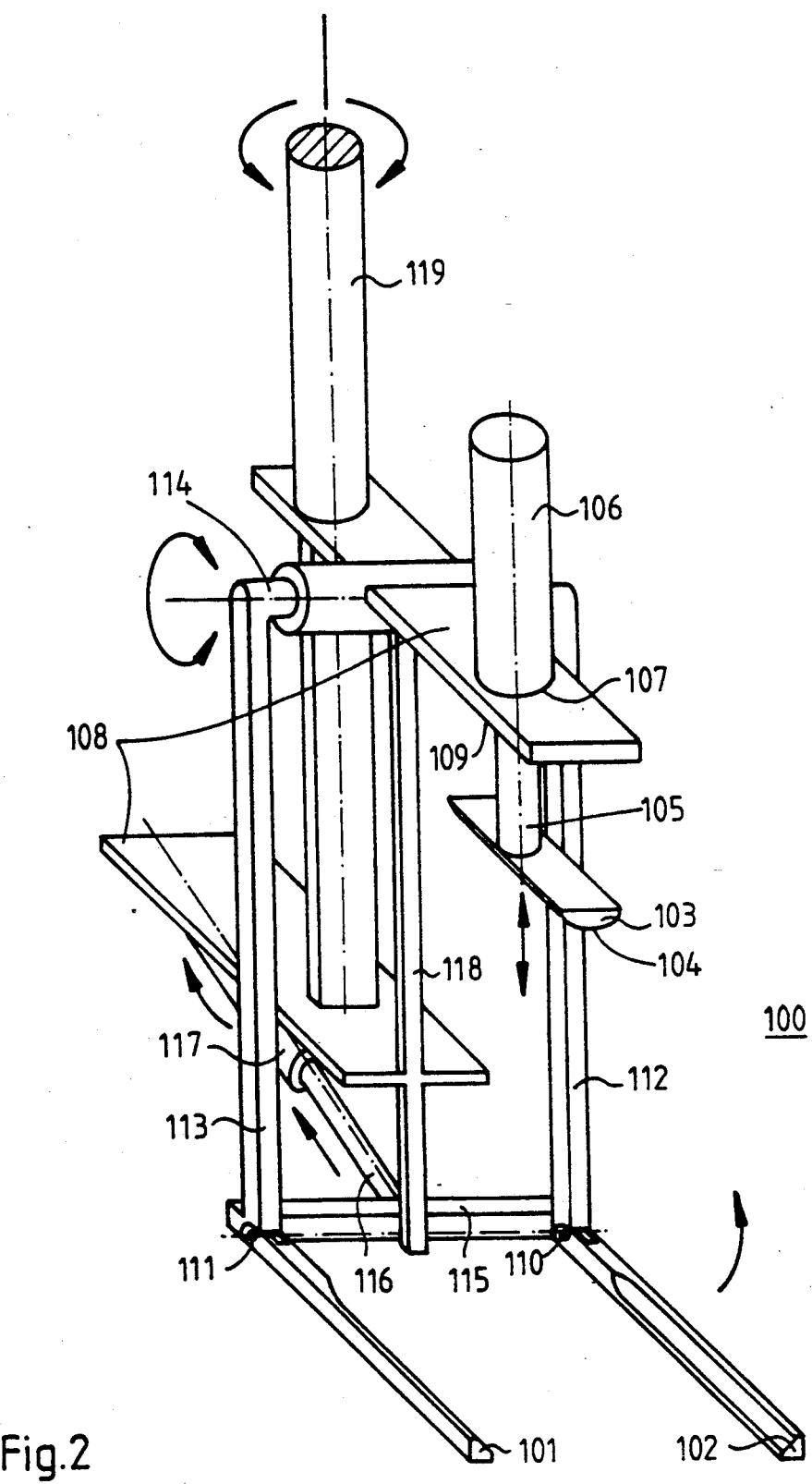
FIG. 2 is a perspective view of a gripper as a detail of the embodiment of FIGS. 1a and 1b on an enlarged scale.

The gripping device of the preferred embodiment shown in a perspective view in FIG. 2 includes two first tines 101 and 102 which are arranged at a fixed distance and a second tine 103 serving as a counter-element displaceable relative to the oppositely disposed first tines 101 and 102 in a movement plane disposed in the middle between the two first tines 101 and 102.

The second tine 103 is configured as a pressing jaw so that its contact surface 104 has a convex curvature in the direction of the first tines 101 and 102. On the side opposite the contact surface, the second tine 103 is connected with a push-pull rod 105 displaceably received in a pressure cylinder 106. Pressure cylinder 106 is disposed in an opening 107 in a gripper housing 108 and is connected with gripper housing 108 in such a manner that its end face (not visible here) terminates flush with a surface 109 of the gripper housing oriented in the direction toward second tine 103.

The two first tines 101 and 102 are configured as gripper rails, with their laterally facing surfaces being sloped in their upper region. The angle of inclination of the slope is configured differently depending on the material to be palletized. Beginning at the hinge joint, tines 101 and 102 are sloped in the direction toward the free end and, from the gripper rail surface oriented toward the second tine, in the direction toward the oppositely disposed gripper rail surface. The two first tines 102 and 101 are connected by way of hinge joints 110 and 111 with the ends of mutually parallel arranged fork rods 112 and 113. Hinge joints 110 and 111 are configured to be foldable within limits so that the two first tines 101 and 102 can be folded only in the direction of the second tine 103. The other ends of fork rods 112 and 113 are connected with one another by way of a bearing rod 114 which extends transversely to fork rods 112 and 113 and which is mounted in the manner of a hinge in gripper housing 108. On the side opposite first tines 101 and 102, as a continuation of hinges 110 and 111 of the two first tines 101 and 102, a transverse bar 115 is connected with fork rods 112 and 113. In the middle of transverse bar 115, at a rotatable hinge (not visible) a lifting rod 116 is disposed. It extends in the direction toward a pressure cylinder 117 disposed on gripper housing 108 and ends displaceably therein. Pressure cylinder 117 is rotatably suspended on gripper housing 108 at a joint which is not visible.

Between the two fork rods 112 and 113, a stripper 118 is disposed which runs parallel to the axis of movement of second tine 103 and is perpendicular to the plane defined by the two first tines 101 and 102 when they are not folded.

Gripper housing 108 is provided with a connecting rod 119 to which is attached a coupling (hidden in the drawing) for a palletizing robot. Below the coupling, in the direction toward gripper housing 108, connecting rod 119 includes a rotating device (not visible) for rotation relative to a vertical axis in the center of the connecting rod. Likewise below the coupling, connecting rod 119 is provided with a folding device (also not visible) for folding relative to a horizontal axis below the rotating device. Thus the gripping device can be rotated through at least 360° and can be folded in the direction of, opposite to and laterally to the free ends of tines 101 to 103. Connecting rod 119 is disposed on the side of gripper housing 108 where pressure cylinder 106 is also disposed, and lies in the plane defined by the second tine 103 during its movement.

The illustration of FIG. 2 shows the movement axes of the gripper. Gripping or releasing of the gripper and thus picking up and depositing of stacks results in the following sequence of movements. The robot moves the gripper to the stack to be gripped in such a way that the first two gripper tines 101 and 102 are disposed below the stack and gripper tine 103 above the stack. The stack then also lies against stripper 118 and is simultaneously centered with respect to the two first tines 101 and 102 and second tine 103.

Then, the gripping device as a whole is raised and simultaneously the second tine 103 is pushed at twice the speed of the stroke of the gripping device, in the direction of the two first tines 101 and 102. Thus tines 101, 102, and 103 simultaneously grip the stack. When a predetermined gripping pressure is reached as well as a predetermined curvature to stabilize the stack, a robot and/or a conveying device move the gripping device to the depositing location.

The gripping device is now turned about a revolute joint of the rotating device (not visible in the drawing) at connecting rod 119, into the desired depositing direction and is moved by way of a lowering movement also transmitted by connecting rod 119, to a predetermined depositing height immediately above the intermediate member 200. Transverse rod 115, together with lifting rod 116 which enters into pressure cylinder 117, now swings fork rods 112 and 113 away from the stack in the opposite direction about the axis of bearing rod 114. Thus the underside of the stack is able to be set down completely at the stacking location. In order to prevent damage to the intermediate members 200 by the two first gripper tines 101 and 102 when fork rods 112 and 113 swing back, the two first gripper tines 101 and 102 are folded upwardly about the axis of rotation passing through hinge-like joints 110 and 111.

The gripping device is also able to pick up the stack in a reversed manner in that the gripping device is turned about an axis so that the two first tines 101 and 102 are disposed above the stack and the second tine is disposed below the stack.

Figures 3A, 3B:
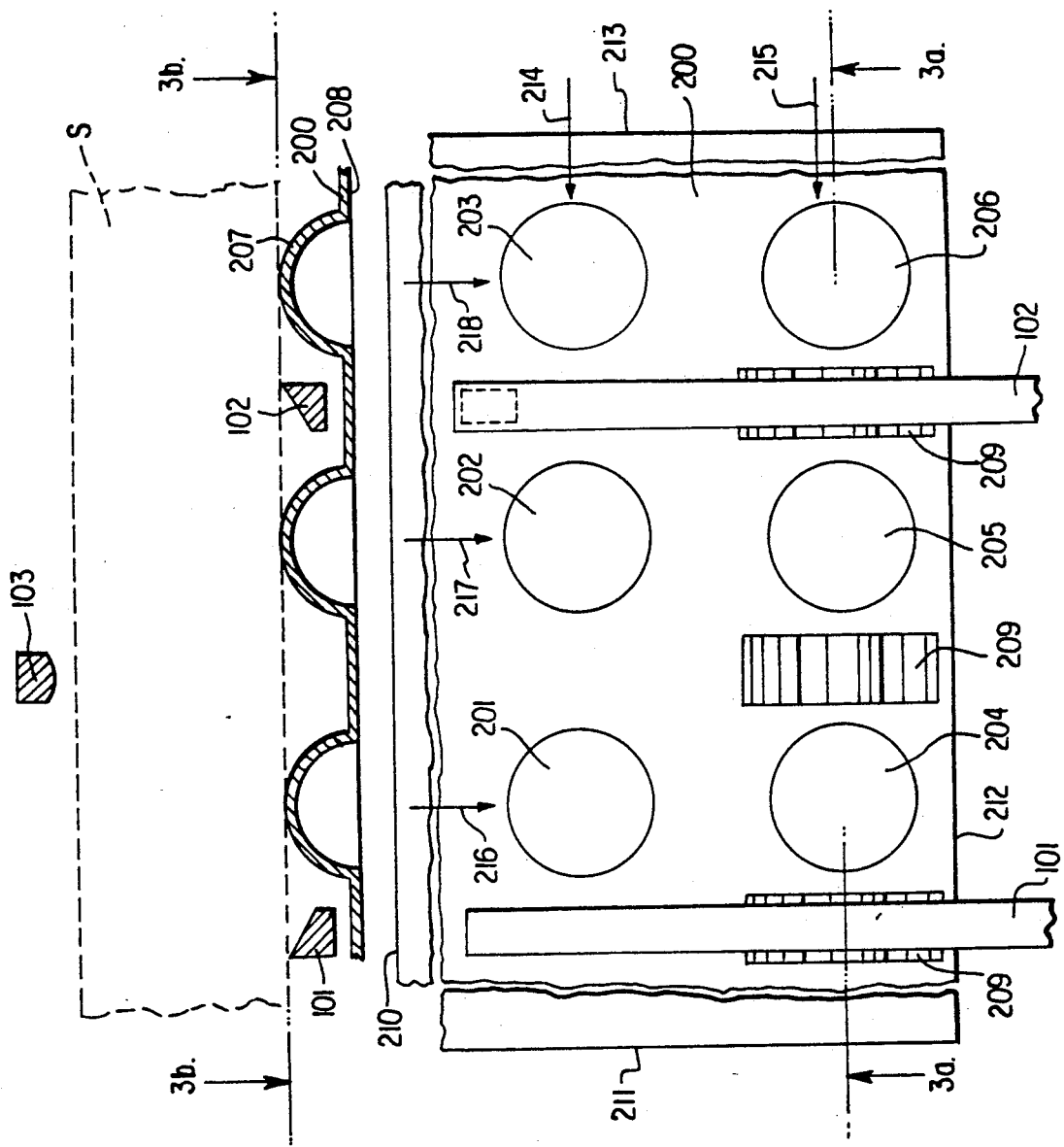

FIGS. 3a and 3b show an intermediate member 200 of the embodiment according to the invention. In each case, the intermediate member 200 extends over an entire pallet and forms a support giving the gripper access in order to depalletize the individual stacks. Once an entire position has been cleared, the intermediate member is removed. It can be re-used and is provided, in particular, with the pieces of information necessary for access of the gripper, particularly regarding the palletizing pattern, so that depalletizing can be performed automatically as soon as the respective information has been read without the robot having to recognize the positions of the individual stacks. On the other hand, the coding of the intermediate members also provides the palletizing patterns for palletizing so that here again no further control measures are required. Each palletizing pattern merely requires a special type of intermediate member provided with the appropriate coding.

The intermediate member 200 is provided with raised portions 201 to 206, with raised portions 201 to 206 being configured in the shape of nubs which are arranged in rows and columns: thus, nubs 201, 202, 203 form a first row 214 and nubs 204, 205, 206 form a second row 215, and further, nubs 201, 204, nubs 202, 205 and nubs 203, 206 form three spaced columns 216, 217 and 218, respectively. The adjoining rows of nubs define upwardly open, parallel first passages whereas the adjoining columns of nubs define upwardly open, parallel second passages which are transverse to the first passages. It will be understood that the intermediate member 200 may have, in reality, a significantly greater number of nubs; FIG. 3b shows only a fragment of the intermediate member 200. The gripper tines are able to move from the four side edges 210, 211, 212 and 213 into the spaces (passages) defined by the nubs. The spacing and height of the nubs is adapted to the gripper tines. Nubs 201 to 206 on the upper side 207 have associated recesses on the underside 208 so that the intermediate members are stackable and nestable. Their surface is smooth so that the intermediate members can be transported by means of suction devices. The upper sides 207 of intermediate members 200 are provided with bar codes 209 in the middle between the nubs. The codes include information about the position of gripping device 100 and the sequence of the palletizing and depalletizing process and are read by a reading device disposed below gripper strip 102 during their entry. If the bar code is readable in the direction of gripper movement, additional drive means to generate a relative movement between the code and the scanning device can be omitted.

FIGS. 3c and 3d show, in a cross-sectional view and in a top view, respectively, intermediate member 200 in a variation having corrugations 210 in place of raised portions 201 to 206. Connecting elements in the form of pull strips 211 and 212 prevent corrugations 210 from being flattened under load.

For the depalletizing of stacks, the intermediate members are a prerequisite. Tines 101 to 103 of gripping device 100 are moved toward the stack in such a way that the two first tines 101 and 102 are disposed below the stack and in the middle between respective nubs and the second tine 103 is disposed above the stack. Thus, the stack is disposed in the middle between the two first tines 101 and 102 and the second tine 103. The first tines grip underneath the stack S to be depalletized and are able to withdraw freely toward the top away from the intermediate member. The intermediate member 200 accordingly remains on the support and is removed after a stack layer has been cleared. (The transporting process as a whole takes place according to the palletizing process described in connection with FIGS. 1a and 1b, beginning with picking up the stack to depositing the stack.)

The palletizing and depalletizing process has been illustrated in FIG. 1b between a longitudinal conveyor 40 and a pallet 60. However, the palletizing robot may also serve further stack pick-up and stack deposit positions of different processing machines. Moreover, it may be integrated into different manufacturing, binding and shipping lines. Such a preferred possibility will be described in greater detail below with reference to FIGS. 4a and 4b. The palletizing robot according to the invention supplies and takes from a gather-stitcher or collector/stapler 70 shown here schematically. In the manner described in connection with FIGS. 1, 2 and 3 for stack pickup, the stack is picked up from a pallet 60 (not visible here) equipped with intermediate members 200 between its stack layers, by gripper tines 101 to 103 and is transported, according to FIG. 4a, in a coordinated movement of guiding device 7, rotating device 8, arm 6 and rotating device 10 to collector/stapler 70.

In the collector/stapler, the stacks are arranged in a position inclined with respect to the horizontal. Lifting rods 21 and 22 move gripping device 100 along with lifting plate 23 by an amount equal to the amount by which the upper face 71 of the collector/stapler lies higher than the upper face of the stack layer. Gripping device 100 is mounted in a folding device 120 so that gripping device 100 is pivotal about a horizontally extending axis 121. Simultaneously with the lifting movement of lifting rods 21 and 22, gripping device 100 is pivoted about a horizontally extending axis 121 in the direction of the sides facing the free ends of the tines into the slope angle of the depository. Then, lifting rods 21 and 22 lower gripping device 100 in the direction toward the collector/stapler until the stack rests on the inclined upper face 72 of the collector/stapler. Then gripper tines 101, 102, and 103 are released from the stack depository in the manner described in connection with FIG. 2.

Figures 4A, 4B:
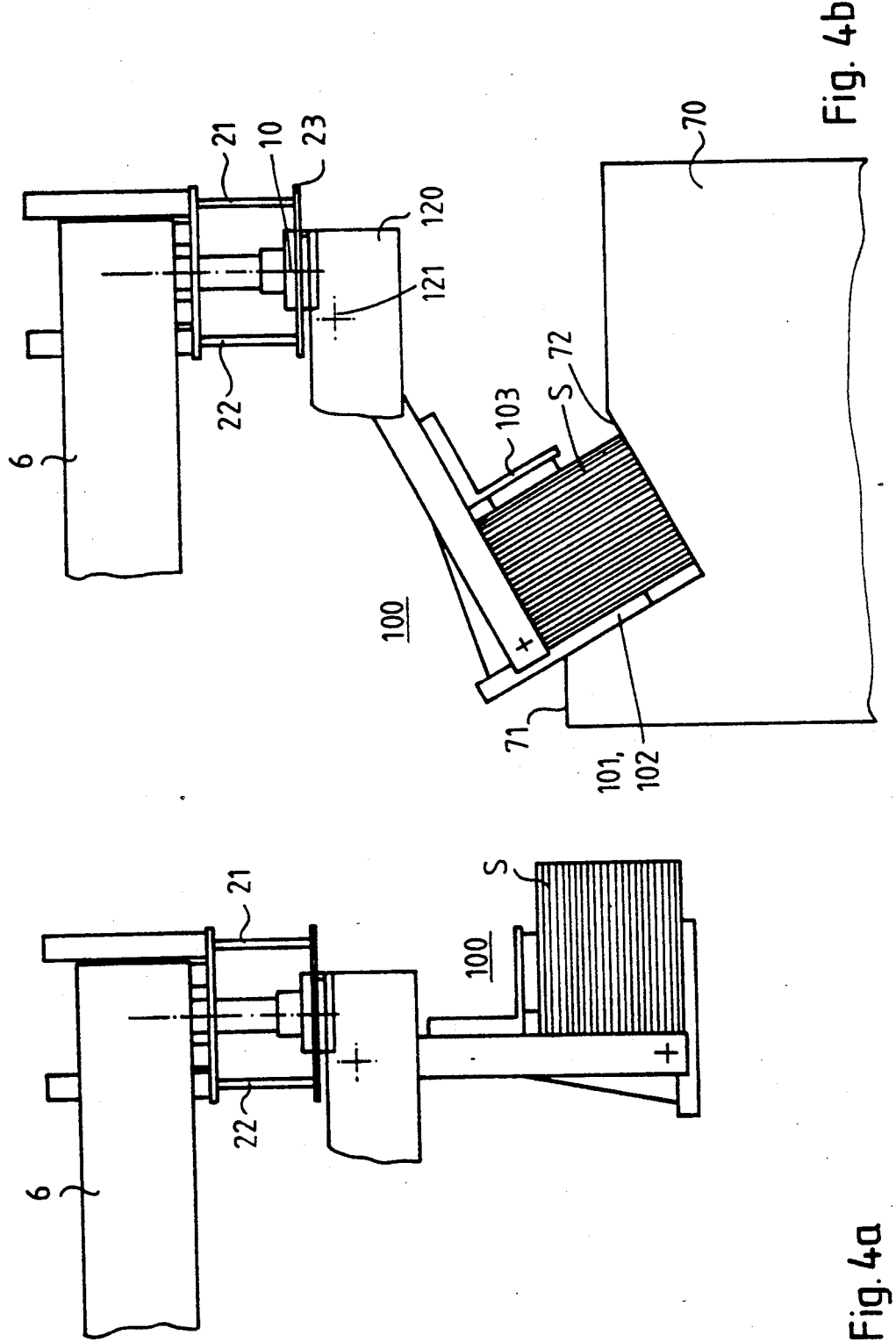
FIG. 4a is a partial view of the gripper region of the embodiment of FIG. 1a, on an enlarged scale in the basic position.
FIG. 4b is a view of the gripper region of FIG. 4a in an inclined position for receiving or depositing a stack.

The collector/stapler shown schematically in FIGS. 4a and 4b is merely an example of its use at a depositing or pick-up location for stacks to be transported. The supplying into, or the removal from the illustrated, inclined position may preferably also be effected in a fanned manner. The respective depositing or pick-up location is preferably also formed by a so-called criss-cross laying device or a pressing station.

Figure 5:
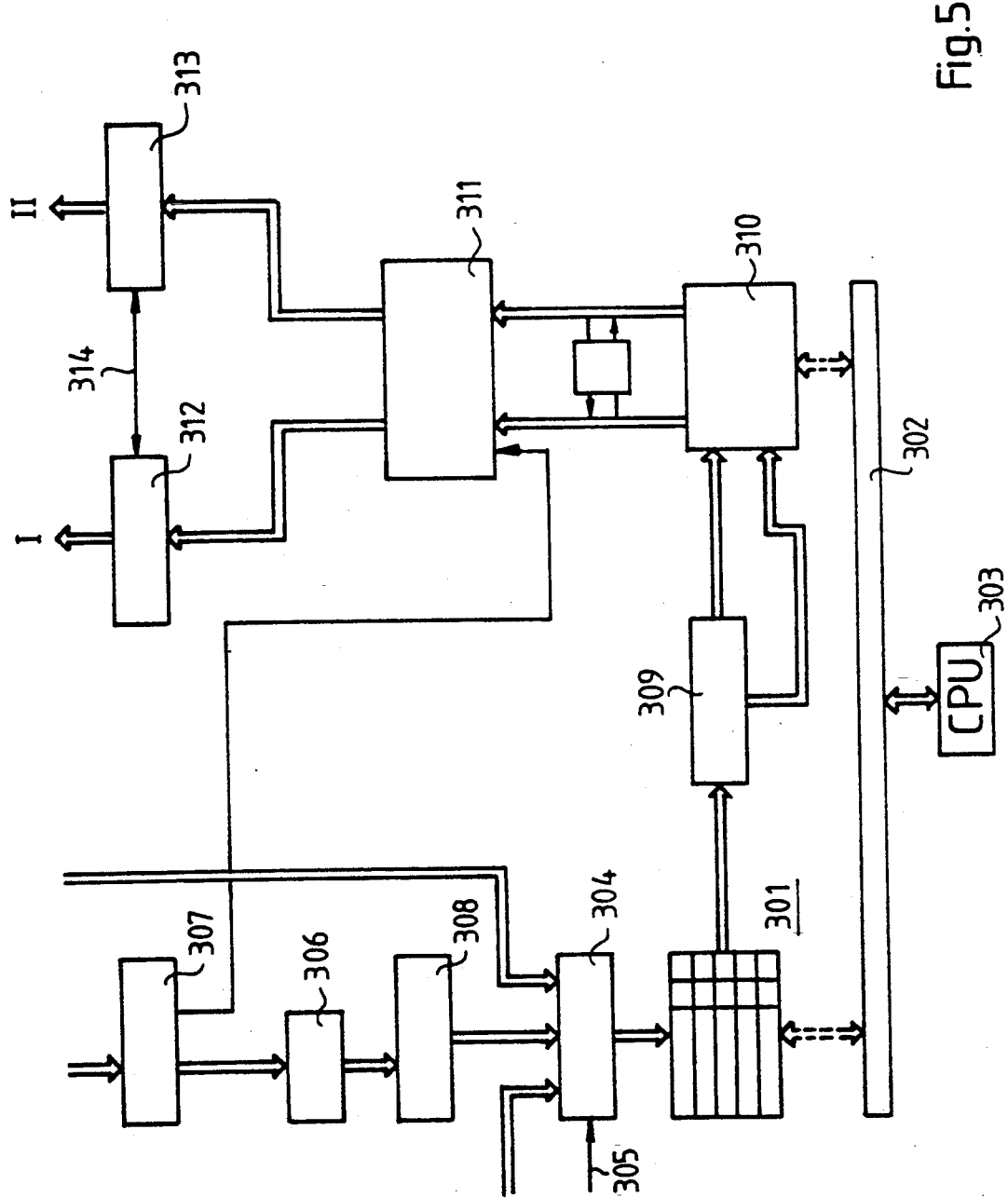

FIG. 5 shows the control of the palletizing robot according to the invention in the form of a block circuit diagram.

In a program memory 301, instructions for complete palletizing and depalletizing processes are stored as a sequence of transporting instructions. Each addressable memory region includes a succession of transporting instructions which are worked off sequentially when the respective memory region is addressed. These instructions include associated pieces of information which are made available by the selection of the access instructions. These pieces of information relate to the time at which the respective transporting instruction is to be performed, and in systems, in which several gripper arms can be utilized to perform the same transporting instruction, they serve to detect the association which definitely assigns the respective transporting instruction to a gripper arm or enables the extension of several or all gripper arms so that an optimum speed can be realized by exchanging tasks. The individual regions for the instruction sequences are illustrated symbolically by boxes in the block circuit diagram of memory 301. The associated pieces of information (small squares) are shown for each one of the instruction sequences shown vertically above one another in the form of rectangles. However, physically each individually addressable instruction sequence is composed of a sequence of instructions which are individually associated with the respective pieces of information.

Each instruction sequence is thus also associated with a palletizing scheme which, in its sequence of transporting instructions, gives information about the distribution of the material on the pallet during palletizing as well as during depalletizing. In this way, it is always possible, independently of the size and number of the stacks to be loaded, to obtain uniform packages which, in particular, go to the edges of the pallets so that a stable stack is produced. The same applies for the supply or removal of merchandise in production and storage regions.

By way of a bus 302, memory 301 is connected in a microprocessor or other computer system with a Central Processing Unit (CPU) 303. The CPU performs the data transfers described below. For the sake of clarity, the respective connecting paths are shown directly in FIG. 5. In a programmable memory system, the respective data exchange, however, is also actuated by CPU 303 via bus 302.

The memory is addressed by way of a selector switch 304 which has various inputs that can be manually selected by way of an actuating element 305. In this connection, manual address input (left input channel) is initially possible in order to predetermine palletizing patterns for depalletizing or palletizing processes by way of direct switch actuation. Correspondingly, a remote input by remote data processing means or by a higher-order central system is possible through the right input channel.

The middle input channel is controlled by a code reader 306 having an associated scanner 307 connected with the gripper arm or its tines and which reads the code provided at a pallet or at an intermediate member and feeds it via a code address converter 308 to memory 301 for decoding the detected codes and output of the address of the associated instruction sequence. In this way, detection of the code results in the automatic selection of a corresponding transporting scheme which is forwarded via a buffer 309 to a block 310 for path optimization. The control signals for two grippers reach a "path guidance" block 311 which converts the individual transporting instructions into concrete control instructions for movement of the arms and gripper components. A first gripper I and a second gripper II are connected with path guidance block 311 by way of corresponding actuation circuits 312 and 313.

In order to coordinate and secure the gripper movements, a lock 314 is initially actuated so as to block coinciding overlapping of the gripper movements. A second gripper arm entering the range of movement during the performance of a transporting instruction is blocked until the first gripper has left the region. With this safety control it is possible to easily coordinate the movements of several grippers. However, in order to also produce time optimization, a "preview" feature is favorable which includes future gripper movements. Since the gripper movements each take place according to a predetermined scheme, during the performance of a transporting instruction, the next instructions in the series are already loaded into buffer 309 which contains a separate shift register for each gripper, with their individual memory positions being separately addressable and changeable. Thus, this is a shift register whose characteristics go beyond those of corresponding commercially available integrated registers and is therefore realized in programmable-memory form.

Under consideration of the processing time information belonging to the individual transporting instructions, the overlap during future transporting instructions is calculated and, if such overlap is determined, a later instruction during which no overlapping takes place is given priority. For this, a further supplemental piece of information stored in connection with a transporting instruction must also be evaluated. It indicates the maximum number of steps by which a respective transporting step can be given priority to be performable. This may also include further conditions which may be important for processing. In practice, it will be easily possible during palletizing or depalletizing to give priority to a transporting instruction which relates to a stack that is included in the row presently being worked. In the coordinated performance of transporting tasks by two or more gripper arms, tasks of the one arm may here be transferred to the other arm in order to be able to compensate for favored time slots for one or the other arm occurring within the scope of the optimization process. For this purpose, those supplemental pieces of information are evaluated which relate to the association of the performance of transporting instructions by the one or the other arm.

The present invention is not limited in its embodiments to the above-described preferred embodiment. Rather, a number of variations are conceivable which take advantage of the described solution even for basically different configurations.

I claim:

1. A palletizing system for moving a stack of objects, said system comprising:
   an arm;
   a gripping device pivotally attached to said arm for rotation about a substantially vertical axis; said gripping device including a plurality of gripping tines having a predetermined spacing between one another; each said gripping tine having a height and a width; and
   a flexible intermediate member for supporting a stack of objects, said intermediate member having more than two side edges and including a plurality of spaced, raised nubs for engaging a lowermost object of the stack; the nubs being arranged in rows and columns and together defining upwardly open, parallel first passages and upwardly open, parallel second passages extending transversely to the first passages; said first and second passages as viewed together, being accessible from more than two side edges of said intermediate member; each passage having a width at least as wide as said width of said gripping tines and having a height at least as high as said height of said tines when the intermediate member supports a stack, for allowing the tines to be unimpededly introduced into the upwardly open passages for directly engaging an underside of the lowermost object to lift the stack by the tines off the intermediate member.

2. A palletizing system as recited in claim 1, wherein said rows and columns are arranged on said intermediate member along lines defining two mutually perpendicular axial directions; said nubs being arranged at identical sequences of spacing in the two axial directions.

3. A palletizing system as recited in claim 1, wherein said nubs include outwardly extending upper surfaces and recessed lower surfaces, and said upper surfaces of one nub are receivable in said recessed lower surfaces of another nub so that the intermediate members are stackable.

4. Intermediate members as recited in claim 3, wherein said intermediate members comprise a thin sheet material of substantially constant thickness.

5. A palletizing system as recited in claim 1, wherein a surface of said intermediate member is substantially smooth for being transported by means of a suction device.

6. A palletizing system for moving a stack of objects, said system comprising:
an arm;
a gripping device pivotally attached to said arm for rotation about a substantially vertical axis; said gripping device including a plurality of gripping tines having a predetermined spacing between one another; each said gripping tine having a height and a width;
an intermediate member for supporting a stack of objects, said intermediate member including a plurality of raised portions between adjacent ones of which upwardly open passages are provided, each said passage being accessible from an edge of said intermediate member, each passage having a width at least as wide as said width of said gripping tines and having a height at least as high as said height of said tines, and said raised portions establishing a spacing between adjacent passages corresponding to said predetermined spacing between said gripping tines;
a control unit on said gripping device;
a reading device operatively connected to said control unit; and
a coding means disposed on said intermediate member for providing codable information scannable by said reading device.

7. A palletizing system as recited in claim 6, wherein said coding means is disposed adjacent said edge of said intermediate member.

8. A palletizing system as recited in claim 7, further comprising a memory device at said gripping device; said memory device being operatively connected to said control unit, said memory device including control codes for a scheme for an arrangement of the stackable objects on pallets; further comprising addressing means associated with said memory device for receiving output signals from said reading device; the output signals being received as input signals by said addressing means for selecting the control codes associated with a scheme for an arrangement of the stackable objects, and means for transmitting the control codes to said control unit for controlling said gripping device for moving the stackable objects.

* * * * *